United States Patent
Kobayashi

(10) Patent No.: US 6,680,734 B2
(45) Date of Patent: Jan. 20, 2004

(54) GAME SYSTEM, IMAGING METHOD IN THE GAME SYSTEM, AND COMPUTER READABLE STORAGE MEDIUM HAVING GAME PROGRAM STORED THEREIN

(75) Inventor: Masayuki Kobayashi, Tokyo (JP)

(73) Assignee: Konami Computer Entertainment Japan, Inc., Tokyo (JP)

( * ) Notice: Subject to any disclaimer, the term of this patent is extended or adjusted under 35 U.S.C. 154(b) by 218 days.

(21) Appl. No.: 09/814,542

(22) Filed: Mar. 22, 2001

(65) Prior Publication Data

US 2001/0024202 A1 Sep. 27, 2001

(30) Foreign Application Priority Data

Mar. 24, 2000 (JP) .................................... 2000-088605

(51) Int. Cl.⁷ .............................................. G06T 15/40
(52) U.S. Cl. ..................................................... 345/422
(58) Field of Search ................................ 345/422, 420, 345/421, 419, 759, 782, 784

(56) References Cited

U.S. PATENT DOCUMENTS

| | | | |
|---|---|---|---|
| 5,125,074 A | | 6/1992 | Labeaute et al. |
| 5,265,214 A | * | 11/1993 | Nitta ........................... 345/422 |
| 5,594,850 A | * | 1/1997 | Noyama et al. ............ 345/632 |
| 5,841,439 A | * | 11/1998 | Pose et al. .................. 345/418 |
| 5,898,433 A | * | 4/1999 | Hijikata ...................... 345/782 |
| 5,923,333 A | | 7/1999 | Stroyan |
| 5,926,182 A | * | 7/1999 | Menon et al. ............... 345/421 |
| 6,020,885 A | * | 2/2000 | Honda ......................... 345/757 |
| 6,100,897 A | * | 8/2000 | Mayer et al. ................ 345/428 |
| 6,320,580 B1 | * | 11/2001 | Yasui et al. .................. 345/421 |

FOREIGN PATENT DOCUMENTS

| | | |
|---|---|---|
| EP | 0 300 703 | 1/1989 |
| EP | 0 455 374 | 11/1991 |
| JP | 64-058068 | 3/1989 |
| JP | 11-66340 | 3/1999 |

* cited by examiner

Primary Examiner—Steven Saras
Assistant Examiner—Huedung X. Cao
(74) Attorney, Agent, or Firm—Jordan and Hamburg LLP

(57) ABSTRACT

An opened polygon including a transparent region for maintaining a backward drawing state is drawn. Next, a mask polygon which inhibits another polygon and texture from begin forwardly drawn afterward and maintains a backward drawing state is drawn behind the drawn opened polygon so as to be superimposed by at least the transparent region thereof. Then, in the case where a new polygon is drawn to be superimposed in front of an opened polygon, behind which the mask polygon is drawn, the new polygon is drawn in a region other than the transparent region of the opened polygon. In this manner, even in the case where another polygon is drawn to be overwritten at the boundary of a plurality of polygons having a positional relationship displayed on a game picture, it is possible to maintain a three-dimensional image.

11 Claims, 7 Drawing Sheets

50  51d  41  40

F I G. 7
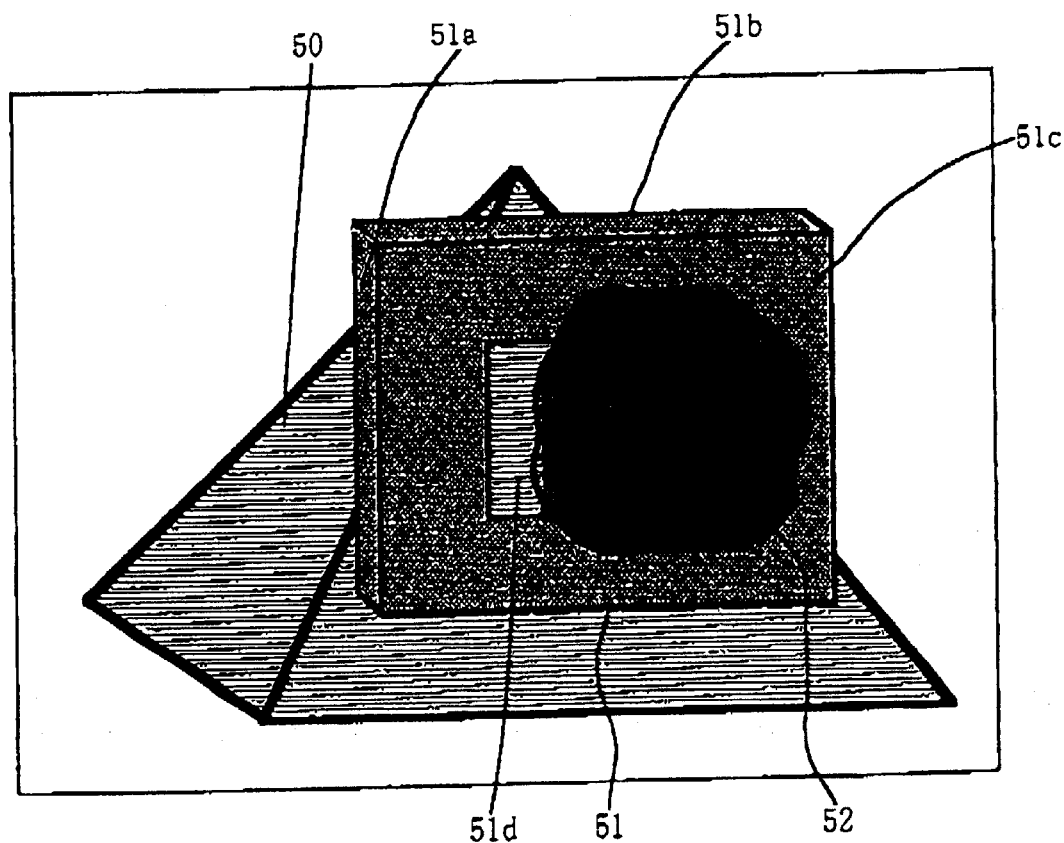

GAME SYSTEM, IMAGING METHOD IN THE GAME SYSTEM, AND COMPUTER READABLE STORAGE MEDIUM HAVING GAME PROGRAM STORED THEREIN

BACKGROUND OF THE INVENTION

1. Field of the Invention

The present invention relates to a game system for displaying a polygon having three-dimensional coordinates to be projected on a two-dimensional plane.

2. Description of the Related Art

In such a game system, in general, a model or character that is an individual object to be displayed on a screen is composed of a number of polygons, each of which is a two-dimensional virtual figure of a triangle or rectangle. A Z-value indicating a depth is provided to each polygon, and a perspective (positional) relationship of polygons is determined based on this Z-value.

Conventionally, in such a game system, in the case where a plurality of polygons are drawn to be overlapped each other, a polygon with its smaller Z-value has been displayed with higher priority relevant to such an overlapped portion.

However, a new polygon is drawn to be overwritten at the boundary of a plurality of objects having a positional relationship with each other in a game picture, there occurs a case in which such positional relationship may be distorted from the viewpoint of a player. For example, in the case where it is specified to draw a polygon having its Z-value smaller than those of these polygons at the boundary of a forwardly positioned polygon and a backwardly positioned polygon, a polygon is displayed so as to be overlapped on both Of the forwardly and backwardly positioned polygons, so that a user hardly recognizes a depth in the picture.

SUMMARY OF THE INVENTION

The present invention has been made in order to solve the foregoing problem. It is an object of the present invention to provide a game system, capable of maintaining a three-dimensional image, even in the case where another polygon is drawn to be overwritten at the boundary of a plurality of polygons having a positional relationship displayed on a game picture.

In order to solve the foregoing problem, according to a first aspect of the present invention, there is provided a game system for drawing a plurality of polygons that configure a three-dimensional object disposed in a virtual three-dimensional space by projecting and converting the polygons on a projection plane in a visual coordinate system, and drawing these plurality of polygons so as to have a positional relationship in front and behind with each other based on a Z-value indicating a depth of a vertex coordinate of each polygon, said game system comprising; a mask polygon drawing device for drawing a mask polygon which inhibits another polygon and texture from being forwardly drawn afterward and maintains a backward drawing state; and a device for, in the case where a new polygon is to be drawn in front of said mask polygon, drawing said new polygon in a region other than a region superimposed on said mask polygon.

According to the thus configured game system, there is drawn a mask polygon which inhibits another polygon and texture from being forwardly drawn afterward and maintains a backward drawing state. In the case where a new polygon is to be drawn in front of the mask polygon, the new polygon is drawn in a region other than a region superimposed on the mask polygon. Therefore, the other polygon can be prohibited from being drawn on the mask polygon. Thus, the mask polygon is disposed at a desired position, thereby enabling a variety of performances on an image.

According to a second aspect of the present invention, there is provided a game system for drawing a plurality of polygons that configure a three-dimensional object disposed in a virtual three-dimensional space by projecting and converting the polygons on a projection plane in a visual coordinate system, and drawing these plurality of polygons so as to have a positional relationship in front and behind with each other based on a Z-value indicating a depth of a vertex coordinate of each polygon, said game system comprising: a device for drawing an opened polygon that contains a transparent region for maintaining a backward drawing state, a device for drawing a mask polygon in at least the transparent region of said drawn opened polygon, said mask polygon inhibiting another polygon and texture from being forwardly drawn afterward and maintaining a backward drawing state; and a device for, in the case where a new polygon is drawn to be superimposed in front of the opened polygon of which said mask polygon is drawn in said transparent region, drawing said new polygon in a region other than the transparent region of said opened polygon.

According to the thus configured game system, an opened polygon that contains a transparent region for maintaining a backward imaging state is drawn. Next, a mask polygon, which inhibits another polygon and texture from being forwardly drawn afterward and maintains a backward drawing state, is drawn in at least the transparent region of the drawn opened polygon. Then, in the case where a new polygon is drawn to be superimposed in front of the opened polygon of which the mask polygon is drawn in the transparent region, the new polygon is drawn in a region other than the transparent region of the opened polygon. Therefore, the other polygon is inhibited from being drawn relevant to the transparent region of the opened polygon, thus making it possible to maintain a three-dimensional image.

According to a third aspect of the present invention, there is provided a game system for drawing a plurality of polygons that configure a three-dimensional object disposed in a virtual three-dimensional space by projecting and converting the polygons on a projection plane in a visual coordinate system, and drawing these plurality of polygons so as to have a positional relationship with each other based on a Z-value indicating a depth of a vertex coordinate of each polygon, said game system comprising: a device for drawing an opened polygon that contains a transparent region for maintaining a backward drawing state; a device for drawing a mask polygon behind the drawn opened polygon so as to be superimposed by at least said transparent region thereof, said mask polygon inhibiting another polygon and texture from being forwardly drawn afterward and maintaining a backward drawing state; and a device for, in the case where a new polygon is drawn to be superimposed in front of the opened polygon, behind which the mask polygon is drawn, drawing said new polygon in a region other than the transparent region of the opened polygon. Accordingly, another polygon is inhibited from being drawn in the transparent area of the opened polygon, thus making it possible to maintain a three-dimensional image.

In the above described game system, the opened polygon and/or a new polygon can be provided with a texture. In such cases, various patterns can be displayed on the polygon.

According to a fourth aspect of the present invention, there is provided a drawing method in a game system for drawing a plurality of polygons that configure a three-dimensional object disposed in a virtual three-dimensional space by projecting and converting the polygons on a projection plane in a visual coordinate system, and drawing these plurality of polygons so as to have a positional relationship in front and behind with each other based on a Z-value indicating a depth of a vertex coordinate of each polygon, said drawing method comprising the processes of: drawing an opened polygon that contains a transparent region for maintaining a backward drawing state; drawing a mask polygon in at least the transparent region of said drawn opened polygon, said mask polygon inhibiting another polygon and texture from being forwardly drawn afterward and maintaining a backward drawing state; and drawing a new polygon to be superimposed in front of the opened polygon of which said mask polygon is drawn in said transparent region. Accordingly, another polygon is inhibited from being drawn in the transparent area of the opened polygon, thus making it possible to maintain a three-dimensional image.

According to a fifth aspect of the present invention, there is provided a drawing method in a game system for drawing a plurality of polygons that configure a three-dimensional object disposed in a virtual three-dimensional space by projecting and converting the polygons on a projection plane in a visual coordinate system, and drawing these plurality of polygons so as to have a positional relationship in front and behind with each other based on a Z-value indicating a depth of a vertex coordinate of each polygon, said drawing method comprising the process of: drawing an opened polygon that contains a transparent region for maintaining a backward drawing state; drawing a mask polygon behind the drawn opened polygon so as to be superimposed by at least said transparent region thereof, said mask polygon inhibiting another polygon and texture from being forwardly drawn afterward and maintaining a backward drawing state; and drawing a new polygon to be superimposed in front of the opened polygon of which said task polygon is drawn in said transparent region. Therefore, the other polygon can be inhibited from being drawn relevant to the transparent region of the opened polygon, thus making it possible to maintain a three-dimensional image.

According to a sixth aspect of the present invention, there is provided a computer readable storage medium having recorded therein a game program for drawing a plurality of polygons that configure a three-dimensional object disposed in a virtual three-dimensional space, the polygons being projected and converted on a projection plane in a visual coordinate system, and drawing the plurality of polygons so as to have a positional relationship in front and behind with each other based on a Z-value indicating a depth of a vertex coordinate of each polygon, said program causing said computer to function as; a mask polygon drawing device for drawing a mask polygon which inhibits another polygon and texture from being forwardly drawn afterward and maintains a backward drawing state; and a device for, in the case where a new polygon is to be drawn in front of said mask polygon, drawing said new polygon in a region other than a region superimposed on said mask polygon, respectively.

According to a seventh aspect of the present invention, there is provided a computer readable storage medium having recorded therein a game program for drawing a plurality of polygons that configure a three-dimensional object disposed in a virtual three-dimensional space, the polygons being projected and converted on a projection plane in a visual coordinate system, and drawing the plurality of polygons so as to have a positional relationship in front and behind with each other based on a Z-value indicating a depth of a vertex coordinate of each polygon, said program causing said computer to function as a device for drawing an opened polygon that contains a transparent region for maintaining a backward drawing state; a device for drawing a mask polygon in at least the transparent region of said drawn opened polygon, said mask polygon inhibiting another polygon and texture from being forwardly drawn afterward and maintaining a backward drawing state; and a device for, in the case where a new polygon is drawn to be superimposed in front of the opened polygon of which said mask polygon is drawn in said transparent region, drawing said new polygon in a region other than the transparent region of said opened polygon, respectively.

According to an eighth aspect of the present invention, there is provided a computer readable storage medium having recorded therein a game program for drawing a plurality of polygons that configure a three-dimensional object disposed in a virtual three-dimensional space, the polygons being projected and converted on a projection plane in a visual coordinate system, and imaging the plurality of polygons so as to have a positional relationship in front and behind with each other based on a Z-value indicating a depth of a vertex coordinate of each polygon, said program causing said computer to function as: a device for drawing an opened polygon that contains a transparent region for maintaining a backward drawing state; a device for drawing a mask polygon behind the drawn opened polygon so as to be superimposed by at least said transparent region thereof, said mask polygon inhibiting another polygon and texture from being forwardly drawn afterward and maintaining a backward drawing state; and a device for, in the case where a new polygon is drawn to be superimposed in front of the opened polygon, behind which the mask polygon is drawn, drawing said new polygon in a region other than the transparent region of the opened polygon.

Therefore, the program of the storage medium according to the seventh to ninth aspects of the invention is executed by a game system computer, whereby the game system of the present invention can be configured.

BRIEF DESCRIPTION OF THE DRAWINGS

In the accompanying drawings:

FIG. 7 is a view showing an example when a polygon having a crater texture attached thereto is drawn in front of the opened polygon in the case where the mask polygon is drawn.

DETAILED DESCRIPTION OF THE PREFERRED EMBODIMENTS

Hereinafter, preferred embodiments of the present invention will be described with reference to the accompanying drawings.

Figure 1:
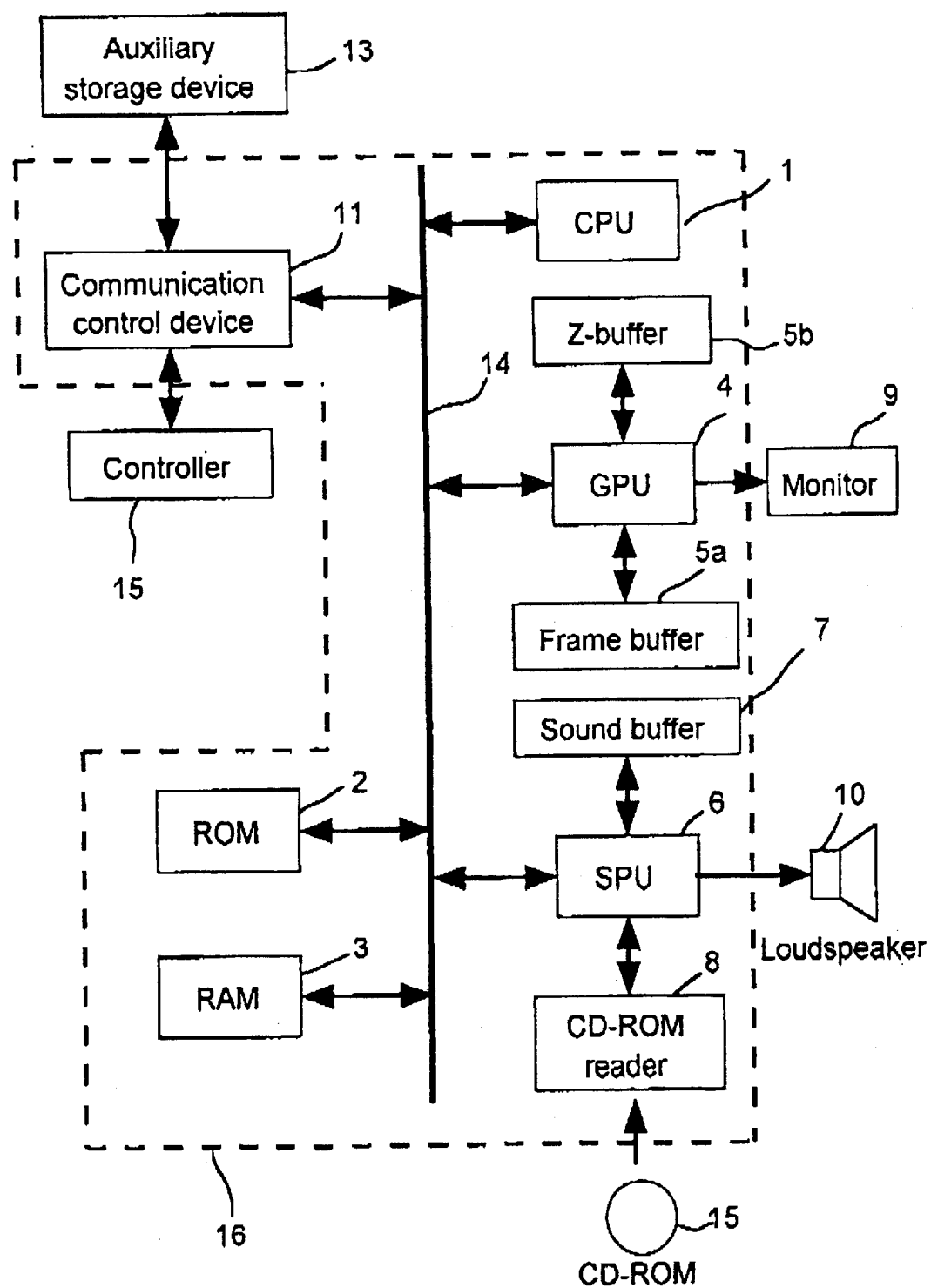
FIG. 1 is a diagram showing a schematic configuration of a game system according to the present invention.

FIG. 1 is a block diagram showing a control system of a home-use game system to which the present invention is applied. The game system executes a predetermined game in accordance with a game program recorded in a CD-ROM 15 as a storage medium.

This game system comprises a CPU 1 mainly consisting of a microprocessor, a ROM 2 and a RAM 3 as main storage devices relevant to the CPU 1, an image and graphics processing unit (hereinafter referred to as GPU) 4, a frame buffer 5a and a Z-buffer 5b relevant to this unit 4, and a CD-ROM reader 8.

In the ROM 2, an operating system is written as a program required for controlling the entire operation of a game machine. In the RAM 3, a game program read from the CD-ROM 15 as a storage medium, an image data or the like is written as required. The image data includes data on a plurality of polygons that configure a three-dimensional object disposed in a virtual three-dimensional space, and data on a texture to be mapped on the polygon for configuring a two-dimensional image. Each polygon includes information regarding a polygon vertex coordinate (x, y, z), a texture coordinate of each vertex (u, v), luminance information and the like. A polygon vertex coordinate "z" (hereinafter, referred to as "Z-value") indicates a depth from the player's viewpoint, and display of a polygon with its small Z-value is effective with respect to opaque polygons. The term "polygon" used herein denotes an object set in a game space, i.e., a polygonal two-dimensional virtual figure that configures a model or character. In the present embodiment, a triangle or rectangle is employed as a configuration of the polygon. The GPU 4 receives polygon data from the CPU 1, converts the data on coordinates from a local coordinate system $(X_p, Y_p, Z_p)$ into a world coordinate system. Further, perspective projection conversion is applied to the data on the positional coordinates of each polygon depending on the world coordinate system, to thereby be converted into coordinates depending on a viewing coordinate system $(X_s, Y_s, Z_s)$ (hereinafter, referred to as "screen coordinate system $(X_s, Y_s, Z_s)$". In addition, a polygon is drawn into the buffer 5a and the Z-buffer 5b, and the data on the produced image is converted into a predetermined video reproduction signal, and is outputted to a monitor 9 at a predetermined timing. Here, a Z-value is written into the buffer 5b. In addition, the GPU 4 can overwrite another polygon on the polygon drawn in the frame buffer 5a and the Z-buffer 5b, and a positional (perspective) relationship of a polygon drawn in the frame buffer 5a and the Z-buffer 5b is determined based on the Z-value that each polygon data has. That is, in the case where a plurality of polygons are drawn to be overlapped each other, a polygon with its smaller Z-value is displayed on the screen of the monitor 9 relevant to the overlapped or superimposed portion.

In addition, when drawing an image into the frame buffer 5a and the Z-buffer 5b, there is applied processing required for drawing such as size change according to perspective view, texture mapping, lighting or the like, The term "local coordinate" used herein denotes a coordinate specific to a polygon, the coordinate moving with the movement of the polygon. The world coordinate denotes a coordinate that is immobilized even if a polygon moves. The screen coordinate denotes a coordinate for determining where a polygon is finally viewed on a screen.

By texture mapping, a texture to be mapped on a polygon is determined on the basis of the texture coordinates (u, v) of each vertex. In addition, each texture has RGB (three primary colors of light) channels. A texture pattern and its color density are determined by setting these channels. In addition, each texture has an A (alpha) channel. Such each channel permits settings required for making the texture transparent or settings of whether or not another texture can be drawn on the texture (the settings are possible for texture regions). For example, in the case where a polygon having a specific region transparently set is drawn, a backward image of the polygon is displayed on the screen of the monitor 9 relevant to such region transparently set (hereinafter, referred to as a "transparent region"). That is, a player can observe a visually perspective image through an image of a polygon proximal to the player's view. In addition, in the case where, drawing is enabled by the A (alpha) channel, another texture pattern or the like is displayed relevant to a portion at which the texture and another texture are overlapped each other. In contract, in the case where drawing is disabled (drawing is inhibited), another texture is inhibited from being drawn relevant to a portion at which the texture and another texture are overlapped each other. Further, in the A (alpha) channel, an intermediate setting between drawing enable setting and drawing disable setting can be performed. In other words, gradation settings can be performed. For example, if an alpha value of the texture is set to A1, and RGB values are set to R1, G1, and B1, respectively, relevant to a pixel, the colors (R, G, B) displayed on a screen are expressed as $R=R1+A1\times R2$, $G=G1+A1\times G2$, and $B=B1+A1\times B2$. This alpha value A1 denotes a mixture rate between the texture and another texture. When A1=0 the drawing of the texture is completely restricted. That is, the color density of another texture is determined based on this A1 value. This is called alpha blending using a destination alpha.

In addition, this game system comprises a sound processing unit (SPU) 6 and a buffer 7 relevant to the unit 6. The SPU 6 reproduces data on voices or sounds read out from the CD-ROM 15, and recorded in the sound buffer 7 or sound source data and the like, and the data is outputted from a loudspeaker 10.

The CD-ROM reader 8 reads a program data or the like recorded on the CD-ROM 15 in accordance with an instruction from the CPU 1, and outputs a signal that corresponds to the read contents. The CD-ROM 15 records a program or data required for executing a game. A household television set is generally used for the monitor 9.

Further, a communication control device 11 is connected to the CPU 1 via a bus 14, and a controller 12 and an auxiliary storage device 13 are removably connected respectively to the device 11. The controller 12 functions as an input device, wherein there are provided operating members for receiving a players operation. The communication control device 11 scans an operation state of the operating member of the controller 12 at a predetermined period, and outputs to the CPU 1 a signal that corresponds to the scanning result. The CPU 1 judges an operation state of the controller 12 based on the signal.

In the above configuration, other constituent elements other than monitor 9, speaker 10, controller 12, CD-ROM 15 and auxiliary storage device 13 are incorporated in a predetermined housing, and configures a game machine main body 16.

In the thus configured game system, a game program recorded in the CD-ROM 15 is loaded on the RAM 3, and is executed by the CPU 1, whereby games in various genres can be played on the screen of the monitor 9. In the present embodiment, the CD-ROM 15 records a program required for executing an action game by the game system and image data corresponding to the image of each scene in a game.

The action game in this embodiment is such that a character to be operated by the player moves freely vertically and horizontally in a virtual three-dimensional space displayed on the screen of the monitor 9, and uses an arm such as gun to fight against another character being an enemy.

Figure 2:
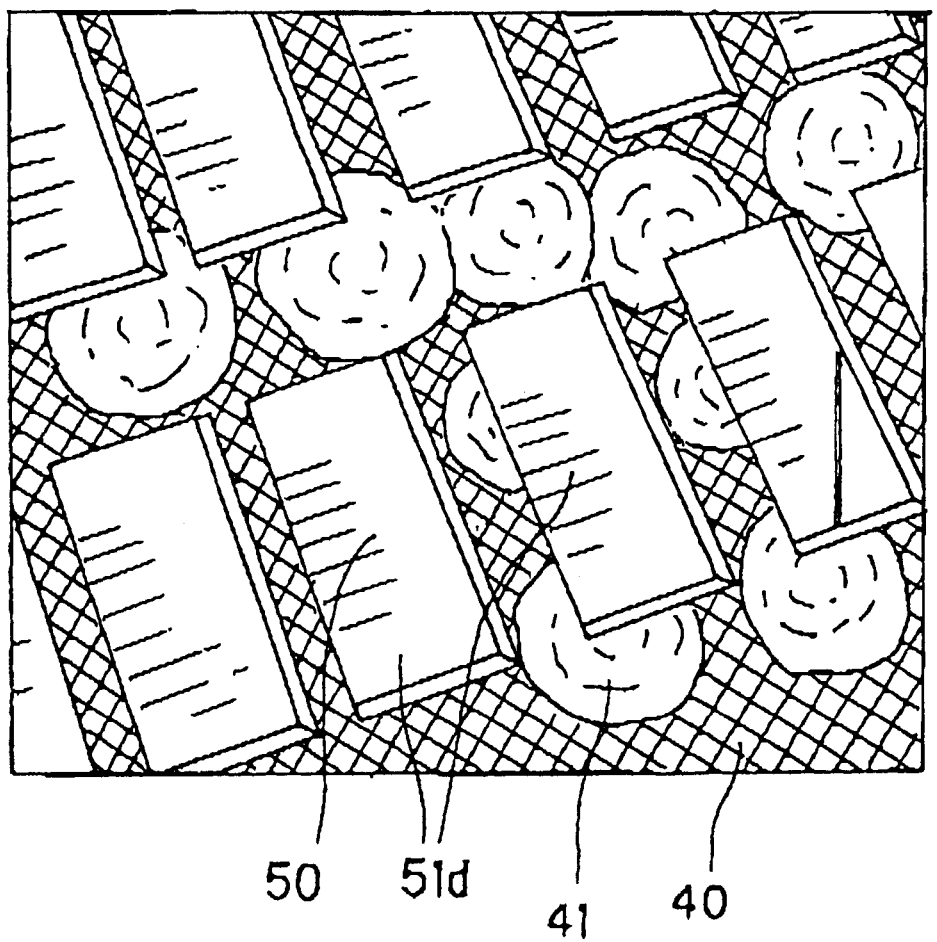
FIG. 2 is a view showing an example of an image when, in one scene of a game, a bullet shot from a character's gun hits a net, and a crater is left.

FIG. 2 shows an example of an image when, in one scene of a game, a bullet shot from a characters gun hits a wire net, and a crater is left thereon. As shown in FIG. 2, a wire net 40 is displayed so as to configure a net pattern in the vertical and horizontal directions of the screen. This wire net 40 is displayed on the screen of the monitor 9 by mapping a texture of the wire net 40 on a polygon. The polygon on which the texture of the wire net 40 is mapped has the above described transparent region 51d, and a backward background object 50 is displayed through this transparent region 51d. In addition, a crater 41 is displayed on the wire net 40. This crater 41 is also displayed on the screen of the monitor 9 by mapping the texture of the crater 41. The Z-value of the polygon on which the texture of the crater 41 is mapped is set to be smaller than the Z-value of the polygon on which the texture of the wire net 40 is mapped, and thus, the crater 41 is displayed on the wire net 40. However, in an example of FIG. 2, the crater 41 is not displayed in a transparent region 51d of the polygon having the texture of the wire net 40 attached thereto. This is because a mask polygon is drawn, the mask polygon having characteristics in which another polygon is inhibited from forwardly being drawn afterward in the transparent region 51d of the polygon mapped thereon the texture of the wire net 40. In this manner, the player can feel the depth of the picture.

Figure 3:
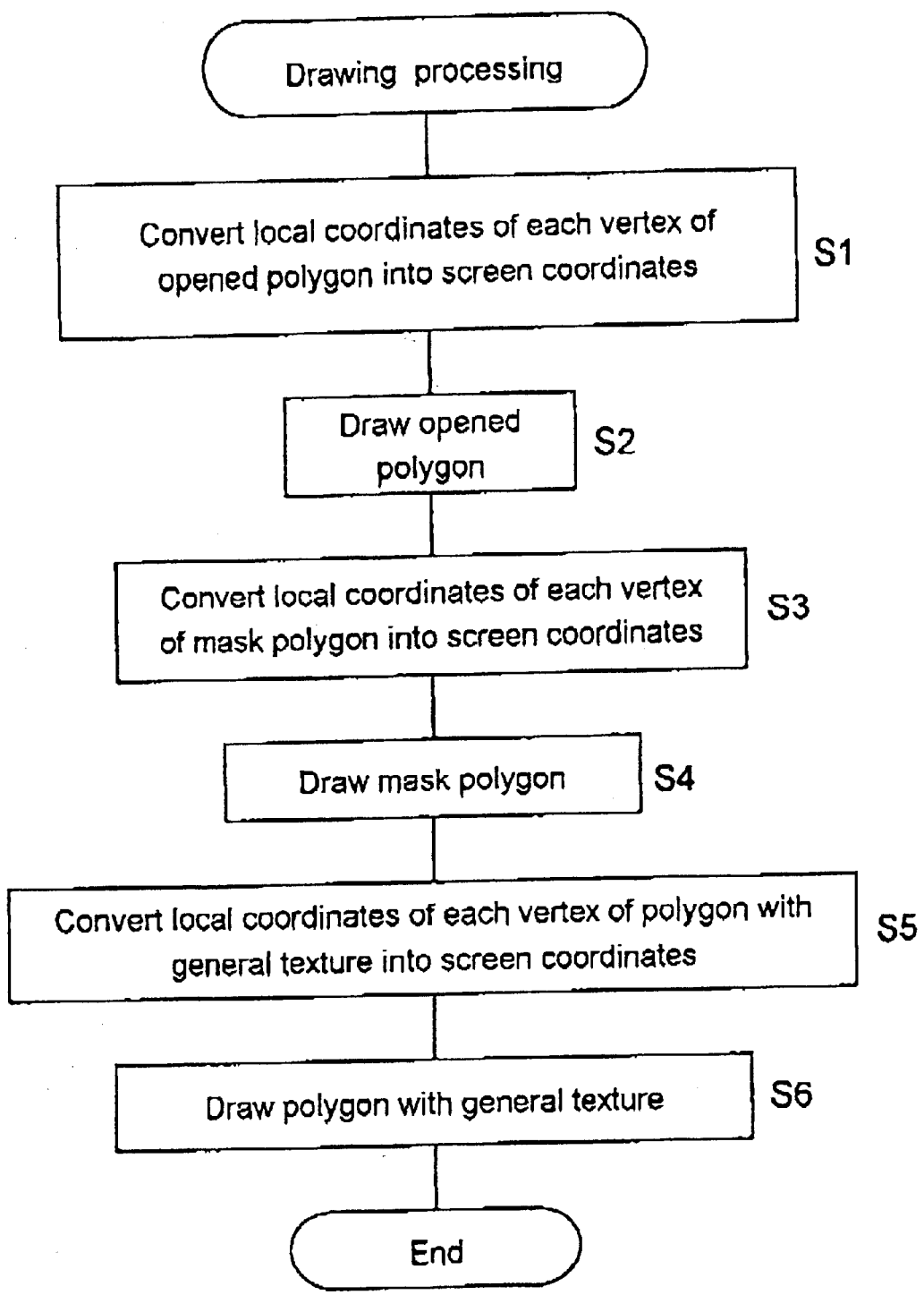
FIG. 3 is a flow chart showing display processing of the game system when an image according to the present invention is displayed.

FIG. 3 is a flow chart showing display processing of a game system when such an image is displayed. Hereinafter, such an image display method will be described in detail with reference to FIGS. 3 to 7. For clarity, a description is given by referring to figures (FIGS. 4 to 7) in which the image shown in FIG. 2 is simplified.

With advancement of a game program, polygon data stored in the RAM 4 is read out by the CPU 1, and the vertex coordinates of the polygon are converted from values depending on the local coordinate system into those depending on the world coordinate system or screen coordinate system (S1). Next, while texture mapping is performed with referring to an A channel portion in the texture data corresponding to the texture coordinates of each vertex of such polygon, such polygon is drawn into the frame buffer 5a and the Z-buffer 5b in accordance with the screen coordinates (S2). Thus, an object consisting of a plurality of polygons is displayed on the screen of the monitor 9.

Figure 4:
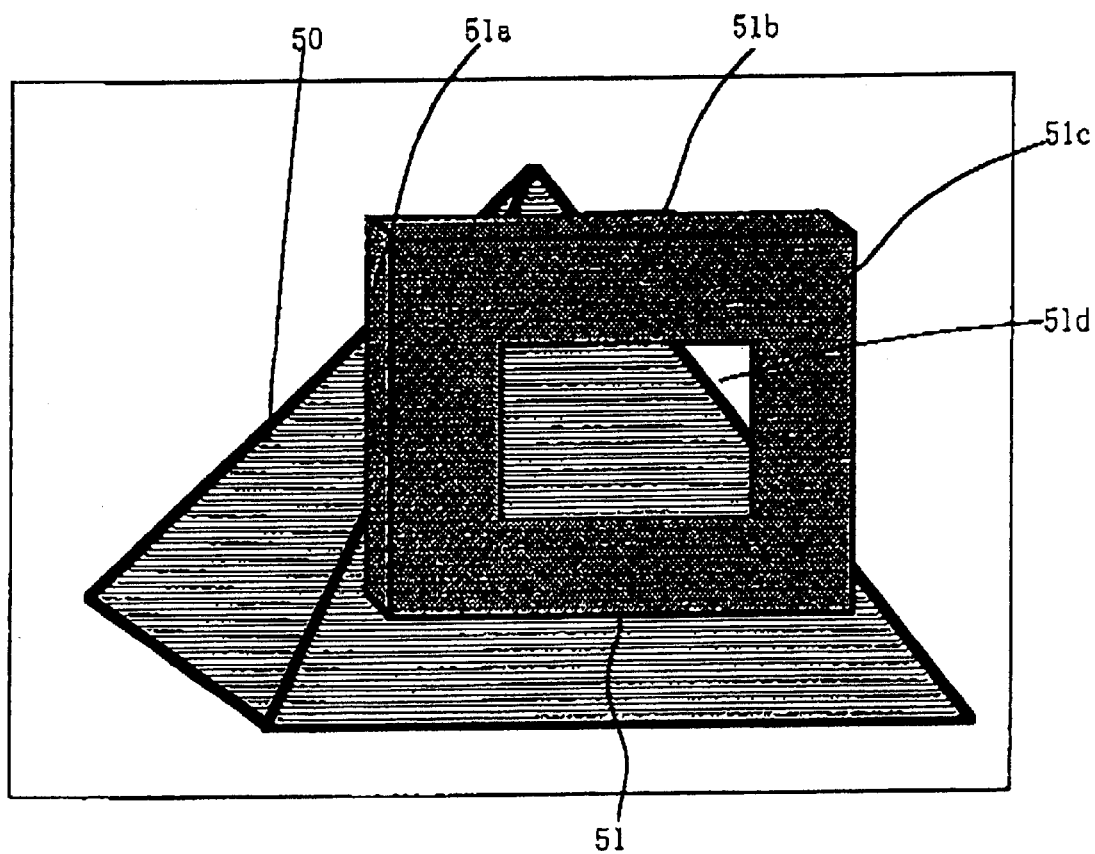
FIG. 4 is a view showing an example when an object that contains a polygon having its transparent region is displayed on a picture.

FIG. 4 is a view showing an example when an object that contains a polygon having its transparent region is displayed on the screen of the monitor 9. As shown in FIG. 4, on the screen of the monitor 9, an object 51 is displayed to be superimposed on a background object 50. This object 51 is composed of polygons 51a, 51b, and 51c. In addition, the polygon 51c (hereinafter, referred to as an "opened polygon 51c") corresponds to a polygon mapped thereon a texture of the wire net 40 in FIG. 2. As shown in FIG. 4, this polygon has a transparent region 51d, and the backward background object 50 is viewed from the region 51d. This is because the region is set in channel A as a region to be transparent.

Next, in the case where the bullet shot from a character's gun reaches the wire net 40, the mask polygon data stored in the RAM 40 is read out by the CPU 1, and the vertex coordinates of the polygon are converted from the values depending on the local coordinate system into the values depending on the world coordinate system or screen coordinate system (S3). Then, by means of the GPU 4, a mask polygon is drawn only in the A channel portion of the frame buffer 5a while referring to the Z-buffer 5b (in order to draw a mask polygon in only the transparent region 51d of the opened polygon 51c) (S4). In this manner, a mask polygon is drawn in the transparent region 51d of the opened polygon 51c. This mask polygon is a polygon which has vertex coordinates of a polygon superimposed on the already drawn opened polygon 51c, and has the Z-value greater than that of the opened polygon 51c.

Figure 5:
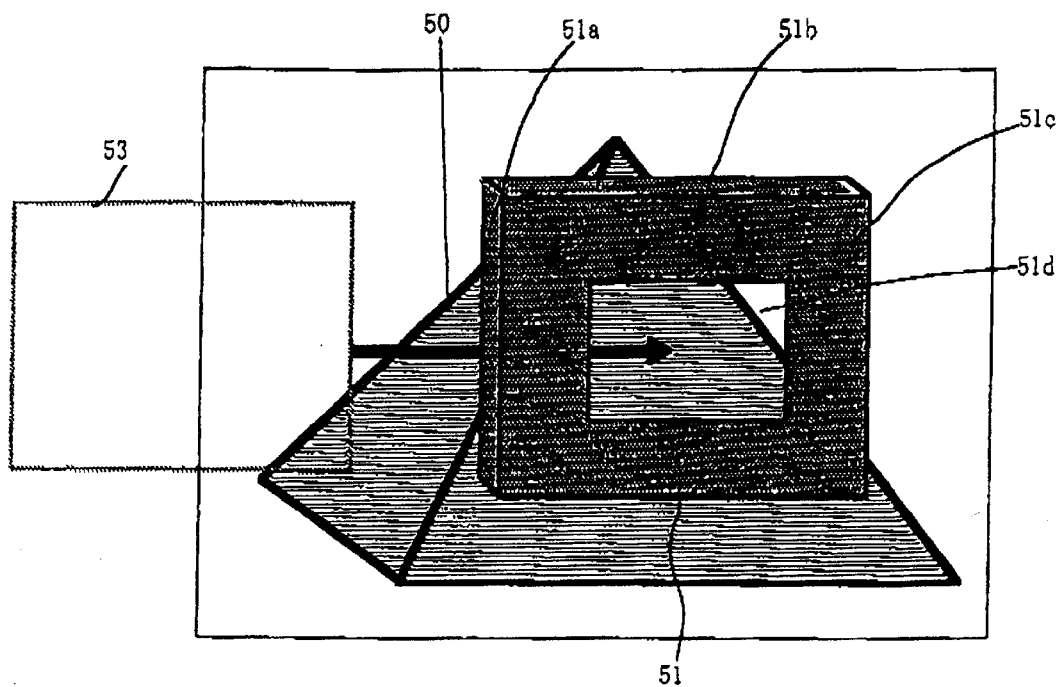
FIG. 5 is a view showing an example when a mask polygon is drawn behind an opened polygon in the display state of FIG. 4.

FIG. 5 shows an example in which, in the display state of FIG. 4, a mask polygon 53 is to be drawn between the opened polygon 51c and the object 50. In addition, in the example of FIG. 5, although in the mask polygon 53, its all regions are set to be transparent, such transparent regions have different characteristics from the transparent region 51d of the opened polygon 51c. This settings for disabling drawing can be performed by the A channel, as described previously. In FIG. 5, even in the case where the mask polygon 53 is drawn behind the opened polygon 51c so as to be superimposed by the opened polygon 51c, the display state shown in FIG. 4 is maintained. However, actually, only in the transparent region 51d of the opened polygon 51c, the mask polygon 53 is drawn. The mask polygon 53 may be drawn so as to be engaged into the transparent region 51d of the opened polygon 51c.

Next, polygon data for the crater 41 stored in the RAM 4 is read out by the CPU 1, and the vertex coordinates of the polygon are converted from the values depending on the local coordinate system to those depending on the world coordinate system or the screen coordinate system (S5). This polygon has vertex coordinates of a polygon to be overlapped with the already drawn opened polygon 51c and mask polygon 53, and are smaller than the opened polygon 51c in z-value. Then, texture mapping is performed with referring to an A channel portion in the texture data that corresponds to the texture coordinate of each vertex of the polygon. In addition, such polygon is drawn in the frame buffer 5a in accordance with the screen coordinate while referring to the A channel in the frame buffer 5a and Z-buffer 5b (S6).

Figure 6A:
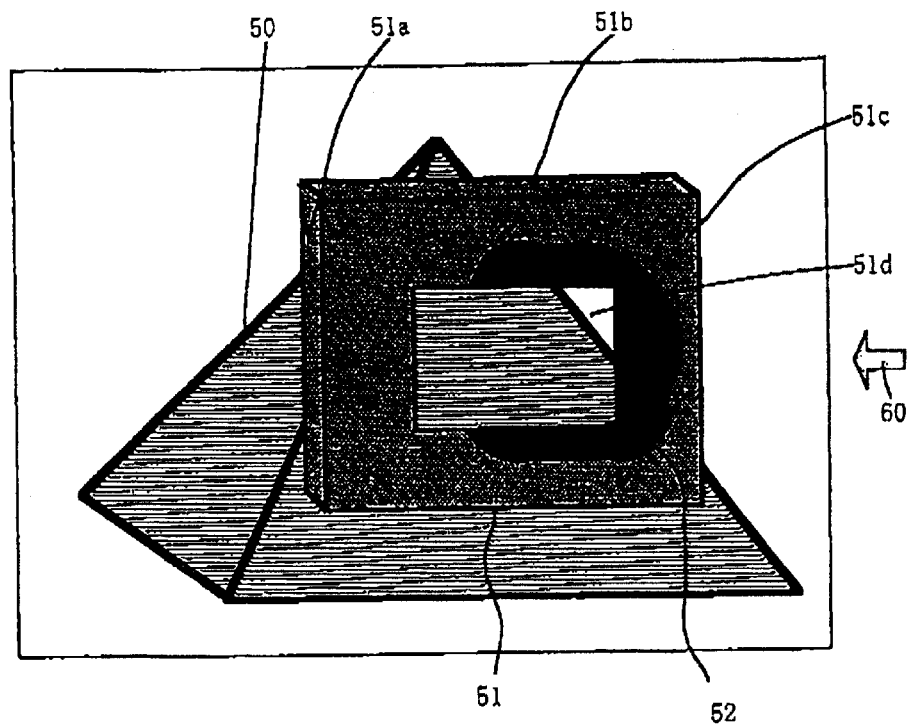
FIGS. 6A and 6B are views showing an example when a polygon having a crater texture attached thereto is drawn in front of the opened polygon in the case where the mask polygon is drawn.
Figure 6B:
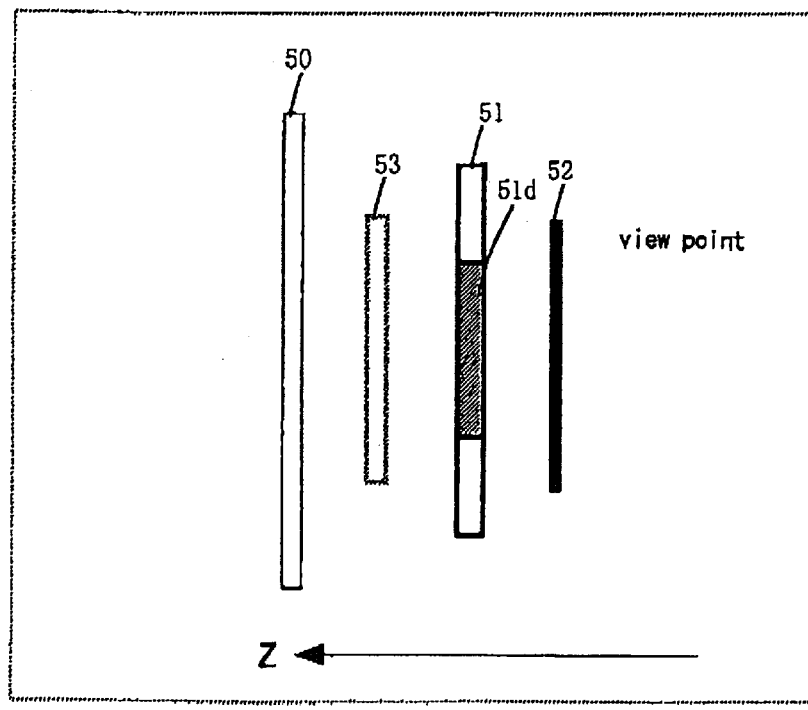

FIG. 6A is a view showing an example when a mask polygon 53 is drawn as shown in FIG. 5, and then, a polygon 52 mapped thereon a crater texture 52a is drawn in front of the opened polygon 51c. As shown in FIG. 6A, a portion of the texture 52a of the polygon 52 is drawn only in a region other than the transparent region 51d of the opened polygon 51c. This is because the mask polygon 53 is drawn in the transparent region 51d of the opened polygon 51c, and thus, a portion of the texture 52a of the polygon 52 is inhibited from being drawn. FIG. 6B is an imaginary view showing a positional relationship between polygons viewed from the direction indicated by an arrow 60 of FIG. 6A. FIG. 6B shows that a Z-value increases as the polygon is distant from the viewpoint. As shown in FIG. 6B, each polygon is determined in positional relationship based on the Z-value, wherein the opened polygon 51c is sandwiched between the backward mask polygon 53 and the polygon 52 mapped thereon the forward texture 52a. There is no obstacle between the polygon 52 and the mask polygon 53 by means of a transparent region 51d of the opened polygon 51c.

In the case where this mask polygon 53 is not drawn as described above, as shown in FIG. 7, the texture 52a of the polygon 52 is drawn in the transparent region 51d of the opened polygon 51c as well. That is, a portion of the texture 52a of the polygon 52 is drawn on the background object 50 through the transparent region 51d. In the example of FIGS.

6A and 6B, although another polygon is inhibited from being forwardly drawn afterward relevant to all the regions of the mask polygon 53, it is possible to set drawing so as to be inhibited by defining only a partial region of the mask polygon 53 as a mask region.

Thus, the mask polygon 53 is drawn backward of the polygon 51 having the texture of the net 40 attached thereto, whereby, even wherever the bullet shot from a character's gun reaches, a three-dimensional image can be maintained.

In the foregoing embodiment, although a mask polygon is drawn in the transparent region of the opened polygon, such mask polygon can be drawn in an opaque region of the polygon. For example, when a crater is displayed so as to encompass a plurality of polygons, a mask polygon is drawn in an opaque region of a plurality of polygons, whereby even whatever the rims of these polygons are shaped to be complicated, the crater along such rims can be cut out without performing complicated computation such as dividing the crater texture.

In the foregoing embodiment, although a description has been given with respect to a crater displayed on a net, the other object may be employed without being limited thereto.

In addition, the present invention is applicable to games in any genre such as a roll playing game, a simulation game or an action game.

As has been described above, according to the present invention, a mask polygon is attached to a region in which a polygon displayed on a game screen is not drawn to be overwritten, whereby only the corresponding region can be inhibited from being drawn to be overwritten, and thus, a three-dimensional image can be maintained.

What is claimed is:

1. A game system for drawing polygons that configure a three-dimensional object disposed in a virtual three-dimensional space by projecting and converting the polygons on a projection plane in a visual coordinate system, and drawing the polygons so as to have a positional relationship in front of and behind one another based on a Z-value indicating a depth of a vertex coordinate of each polygon, said game system comprising:

a mask polygon drawing device for drawing a mask polygon which inhibits an added polygon and texture from being forwardly drawn after said mask polygon has been drawn while maintaining a backward drawing state; and a device for drawing said added polygon in a region other than a region superimposed on said mask polygon when the added polygon is drawn in front of said mask polygon.

2. The game system according to claim 1, wherein said added polygon is provided with a texture.

3. A game system for drawing polygons that configure a three-dimensional object disposed in a virtual three-dimensional space by projecting and converting the polygons on a projection plane in a visual coordinate system, and drawing the polygons so as to have a positional relationship in front of and behind one another based on a Z-value indicating a depth of a vertex coordinate of each polygon, said game system comprising:

a device for drawing an opened polygon that contains a transparent region for maintaining a backward drawing state;

a device for drawing a mask polygon in at least the transparent region of said drawn opened polygon, said mask polygon inhibiting an added polygon and texture from being forwardly drawn after said mask polygon has been drawn while maintaining the backward drawing state; and a device for drawing said added polygon in a region other than the transparent region of said opened polygon when the added polygon is drawn to be superimposed in front of said opened polygon having said mask polygon drawn in said transparent region thereof.

4. The game system according to claim 3, wherein each of said opened polygon and said added polygon is provided with a texture.

5. A game system for drawing polygons that configure a three-dimensional object disposed in a virtual three-dimensional space by projecting and converting the polygons on a projection plane in a visual coordinate system, and drawing the polygons so as to have a positional relationship in front of and behind one another based on a Z-value indicating a depth of a vertex coordinate of each polygon, said game system comprising:

a device for drawing an opened polygon that contains a transparent region for maintaining a backward drawing state;

a device for drawing a mask polygon behind said opened polygon so as to be superimposed with at least said transparent region thereof, said mask polygon inhibiting an added polygon and texture from being forwardly drawn after said mask polygon has been drawn while maintaining a backward drawing state; and a device for drawing said added polygon in a region other than the transparent region of the opened polygon when the added polygon is drawn to be superimposed in front of said opened polygon behind which said mask polygon is drawn.

6. The game system according to claim 5, wherein each of said opened polygon and said added polygon is provided with a texture.

7. A drawing method in a game system for drawing polygons that configure a three-dimensional object disposed in a virtual three-dimensional space by projecting and converting the polygons on a projection plane in a visual coordinate system, and drawing the polygons so as to have a positional relationship in front of and behind one another based on a Z-value indicating a depth of a vertex coordinate of each polygon, said drawing method comprising the processes of:

drawing an opened polygon that contains a transparent region for maintaining a backward drawing state;

drawing a mask polygon in at least the transparent region of said opened polygon, said mask polygon inhibiting an added polygon and texture from being forwardly drawn after said mask polygon has been drawn while maintaining a backward drawing state; and drawing the added polygon to be superimposed in front of the opened polygon having said mask polygon drawn in said transparent region thereof.

8. A drawing method in a game system for drawing polygons that configure a three-dimensional object disposed in a virtual three-dimensional space by projecting and converting the polygons on a projection plane in a visual coordinate system, and drawing the polygons so as to have a positional relationship in front of and behind one another based on a Z-value indicating a depth of a vertex coordinate of each polygon, said drawing method comprising the processes of:

drawing an opened polygon that contains a transparent region for maintaining a backward drawing state;

drawing a mask polygon behind said opened polygon so as to be superimposed with at least said transparent region thereof, said mask polygon inhibiting an added polygon and texture from being forwardly drawn after said mask polygon has been drawn while maintaining a backward drawing state; and drawing a new polygon to be superimposed in front of the opened polygon of which said mask polygon is drawn in said transparent region.

9. A computer readable storage medium having recorded therein a game program for drawing polygons that configure a three-dimensional object disposed in a virtual three-dimensional space, the polygons being projected and converted on a projection plane in a visual coordinate system, and drawing the polygons so as to have a positional relationship in front of and behind one another based on a Z-value indicating a depth of a vertex coordinate of each polygon, said program causing said computer to function as:

a mask polygon drawing device for drawing a mask polygon which inhibits an added polygon and texture from being forwardly drawn after said mask polygon has been drawn while maintaining a backward drawing state; and a device for drawing said added polygon in a region other than a region superimposed on said mask polygon when the added polygon is drawn in front of said mask polygon.

10. A computer readable storage medium having recorded therein a game program for drawing polygons that configure a three-dimensional object disposed in a virtual three-dimensional space, the polygons being projected and converted on a projection plane in a visual coordinate system, and drawing the polygons so as to have a positional relationship in front of and behind one another based on a Z-value indicating a depth of a vertex coordinate of each polygon, said program causing said computer to function as:

a device for drawing an opened polygon that contains a transparent region for maintaining a backward drawing state;

a device for drawing a mask polygon in at least the transparent region of said drawn opened polygon, said mask polygon inhibiting an added polygon and texture from being forwardly drawn after said mask polygon has been drawn while maintaining the backward drawing state; and a device for drawing said added polygon in a region other than the transparent region of said opened polygon when the added polygon is drawn to be superimposed in front of said opened polygon having said mask polygon drawn in said transparent region thereof.

11. A computer readable storage medium having recorded therein a game program for drawing polygons that configure a three-dimensional object disposed in a virtual three-dimensional space, the polygons being projected and converted on a projection plane in a visual coordinate system, and imaging the polygons so as to have a positional relationship in front of and behind one another based on a Z-value indicating a depth of a vertex coordinate of each polygon, said program causing said computer to function as:

a device for drawing an opened polygon that contains a transparent region for maintaining a backward drawing state;

a device for drawing a mask polygon behind said opened polygon so as to be superimposed with at least said transparent region thereof, said mask polygon inhibiting an added polygon and texture from being forwardly drawn after said mask polygon has been drawn while maintaining a backward drawing state; and a device for drawing said added polygon in a region other than the transparent region of the opened polygon when the added polygon is drawn to be superimposed in front of said opened polygon behind which said mask polygon is drawn.

* * * * *